US012448766B2

(12) United States Patent
Castro Zapata et al.

(10) Patent No.: US 12,448,766 B2
(45) Date of Patent: Oct. 21, 2025

(54) OPEN-RIM TOILET WITH PORTS AND OPENINGS IN THE RIM AND A WIDER DISCHARGE CHANNEL ENTRANCE TO PREVENT BLOCKAGE BY WASTE

(71) Applicant: COMPAÑÍA COLOMBIANA DE CERÁMICA S.A.S., Bogota (CO)

(72) Inventors: William de Jesus Castro Zapata, Girardota (CO); Rodrigo Alberto Estrada Mesa, Medellin (CO); Jaime Humberto Valencia Cortes, Girardota (CO)

(73) Assignee: COMPANIA COLOMBIANA DE CREAMICA S.A.S., Bogota (CO)

( * ) Notice: Subject to any disclaimer, the term of this patent is extended or adjusted under 35 U.S.C. 154(b) by 307 days.

(21) Appl. No.: 18/032,925

(22) PCT Filed: Oct. 12, 2021

(86) PCT No.: PCT/IB2021/059346
§ 371 (c)(1),
(2) Date: Oct. 9, 2023

(87) PCT Pub. No.: WO2022/084805
PCT Pub. Date: Apr. 28, 2022

(65) Prior Publication Data
US 2024/0052620 A1 Feb. 15, 2024

(30) Foreign Application Priority Data
Oct. 20, 2020 (CO) .......................... NC2020/0013073

(51) Int. Cl.
*E03D 11/08* (2006.01)
(52) U.S. Cl.
CPC .......... *E03D 11/08* (2013.01); *E03D 2201/40* (2013.01)

(58) Field of Classification Search
CPC ...... E03D 11/02; E03D 11/08; E03D 2201/40
(Continued)

(56) References Cited

U.S. PATENT DOCUMENTS

2010/0251471 A1   10/2010   Cadavid Gonzalez et al.

FOREIGN PATENT DOCUMENTS

| CN | 102149877 | | 8/2011 |
| CN | 103443368 | A | 12/2013 |

(Continued)

OTHER PUBLICATIONS

ISR for International Application No. PCT/IB2021/059346 mailed Jan. 11, 2022.
(Continued)

*Primary Examiner* — Tuan N Nguyen
(74) *Attorney, Agent, or Firm* — Renner, Kenner, Greive Bobak, Taylor & Weber Co., LPA

(57) ABSTRACT

The present invention relates to a toilet comprising an open-rim toilet bowl which combined construction elements generate a unique combination, the implication of which is obtaining a performance that balances the capacity to evacuate solid waste and light floating load while inside the sanitary ware, in addition to the ability to drag waste through the drainage line. In the same way, the toilet of the present invention is intended to minimize the loss of hydraulic potential supplied to it during the flushing action, from the entrance of water through the inlet tray towards a set of flushing ports located in the rim and windows that direct the water in a specific manner, generating a combined effect of floating and inertial release of the heavy load into the well, facilitating the progressive entry of the load into the discharge channel for its evacuation. Thus, said toilet maxi- (Continued)

mizes the result of the previously defined effect, by providing a balance between the formal attributes of a flush action toilet.

7 Claims, 14 Drawing Sheets

(58) Field of Classification Search
USPC .................................... 4/420, 421, 424, 428
See application file for complete search history.

(56) References Cited

FOREIGN PATENT DOCUMENTS

| CN | 104712044 A | * | 6/2015 | ............. E03D 11/02 |
|---|---|---|---|---|
| CN | 109610589 A | * | 4/2019 | ............. E03D 11/02 |
| JP | 2007077755 A | | 3/2007 | |
| WO | 2012012250 A1 | | 1/2012 | |

OTHER PUBLICATIONS

Written Opinion for International Application No. PCT/IB2021/059346 mailed Jan. 11, 2022.

* cited by examiner

OPEN-RIM TOILET WITH PORTS AND OPENINGS IN THE RIM AND A WIDER DISCHARGE CHANNEL ENTRANCE TO PREVENT BLOCKAGE BY WASTE

CROSS REFERENCE TO RELATED APPLICATIONS

This application is a U.S. National Stage Application under 35 U.S.C. § 371 of International Application No. PCT/IB2021/059346 which was filed on 12 Oct. 2021, which claims priority from Colombian Application No. NC2020/0013073 20 Oct. 2020 the disclosures of which are incorporated in their entirety by reference herein.

TECHNICAL FIELD

The present invention is covered in the field of gravity flushing toilets, characterized by having a water storage tank, wherein this kind of toilets are comprised in the bowl with a water outlet in the upper part of the bowl, said outlet can be through closed rim, open rim or rimless.

Thus, the present invention refers to a high efficiency open rim toilet with a high degree of cleaning in the bowl, where a high efficiency toilet is a toilet which meets an average consumption in flush of 4.8 liters per flush and also, it is capable of discharging a minimum of 350 gr of solid waste, under essay as described in standard ASME A112.19.2.2018, item 7.9.

Thus, the present invention is directed to a toilet comprising an open-rim toilet bowl which combined construction elements generate a unique combination, the implication of which is obtaining a performance that balances the capacity for evacuation of solid waste and light floating load inside the sanitary ware, in addition to the ability to drag waste through the drainage line.

In the same way, the toilet of the present invention is intended to minimize the loss of hydraulic power supplied thereto during the flushing action, from the entrance of the water through the inlet tray towards a set of flushing ports located in the rim and windows or openings that direct the water in a specific manner, generating a combined effect of floating and inertial release of the heavy load into the well, facilitating the progressive entry of the load into the discharge channel for its evacuation. Thus, said toilet maximizes the result of the previously defined effect, by providing a balance between the siphonic action during evacuation and the formal attributes that facilitate the evacuation of heavy loads that flush-action toilets have.

BACKGROUND OF THE INVENTION

In the toilets industry there are different types of these, which depend on their components and the way in which they are arranged or configured, among which are open rim toilets, which are characterized by having a rim all around the upper contour of the bowl, but where said rim has an open lower surface, which allows the flushing water to be distributed throughout the entire length of the bowl and it can be flushed and cleaned.

Thus, open-rim toilets have a manufacturing process that is simpler than that of closed-rim and rimless toilets, which means that the manufacturing cost is very low compared to other types of toilets.

However, open rim toilets are characterized by not having a good performance in the evacuation of solid loads, which has reduced their application in new product developments, taking into account that they do not meet the high-performance standards applicable to toilets, such as ASME A112.19.2-2018 item 7.9.

In this regard, a plurality of disclosures related to open rim toilets is known in the state of the art, among which is document JP2001303650 that discloses a Western style flush toilet stool which is excellent in quietness, free from a fear of wetting a floor surface, excellent in bowl portion washing ability and waste discharging performance, and can reduce its production cost, wherein the toilet comprises a main body having a rim and a trap portion, wherein the body includes a flushing device. The rim is open and has a rim water passage formed therein, and it is exposed or opened toward the bowl portion to discharge water. The flushing device is set such that flush water is discharged from one direction into the rim water passage.

However, this anteriority has a disadvantage related to the fact that the toiled disclosed therein is based on the drag flush or "washdown" principle due to the disposition of its waste outlet, in which the discharge does not take advantage of gravity nor has a siphonic discharge channel configuration, but it is performed through the side/back portion thereof, instead of the bottom, as well as the water level in the bottom of the bowl is not high enough to avoid the solid waste inside the toilet bowl from adhering to the walls causing dirtiness and other undesired inconvenience. Similarly, the toilet defined in said anteriority has a constant diameter in the discharge/trapway, which does not allow the power in said trapway to increase by having the siphonic effect, which would lead, in some cases, to inadequate or insufficient discharges.

Now, there is also document US2013019391 related to a flush toilet comprising a bowl portion including a waste receiving surface and a rim portion; spout portions for spouting flush water supplied from a reservoir tank into the bowl portion; and a water discharge trap pipe for discharging waste, the inlet of which is connected to the bottom of the bowl portion, whereby the bowl portion waste receiving surface includes an upper waste receiving surface connected to the rim portion, and a concave portion connected between the upper surface and the discharge trap pipe, wherein said concave portion includes a bottom surface connected to the discharge trap pipe. Moreover, the rim portion creates an exit shape such that the discharge water does not splash outwards, and wherein the rim inner portion formed along the rim circumference has a shape known as open rim.

Nevertheless, the toilet defined in this previous document has the drawback that the discharge channel does not feature any type of diameter reduction that allows to improve the discharge, while the waste receiving surface does not have a desired width and, therefore, solid residues can be left behind when discharging, which can lead to stains or dirt problems, which are uncomfortable and undesirable for users. Likewise, the toilet rim defined in this prior art document is completely open at the bottom, which translates into excessive water consumption when flushing.

On the other hand, in the state of the art there is also document US2013219605 which teaches a siphonic gravity-powered toilet, which corresponds to a rimless toilet and includes a toilet bowl assembly having a body and an inlet for receiving fluid. The toilet bowl has an interior surface with an upper peripheral portion configured to have a "shelf" formed therein below an upper peripheral edge of the toilet bowl. The rimless toilet includes a jet having a jet inlet, an outlet and at least one jet channel. A manifold is included which is configured such that fluid entering an inlet of the bowl assembly divides into a portion that enters the jet and a portion that enters the interior area of the toilet bowl.

However, this prior art document features the drawback that the rim is absent and it is not open type, as well as the waste discharge pipeline maintains its diameter along the trajectory, and the width of the inlet to such a pipeline is not properly long for a desired waste discharge. Similarly, this toilet in the bowl bottom surface has an elongated space which does not prevent stains from wastes and creates inconvenience in its use.

Finally, document U.S. Pat. No. 9,260,851 discloses a toilet including a bowl portion including a waste receiving surface, a rim portion and a shelf portion; a rim spouting portion disposed on the rim portion for spouting flush water onto the shelf portion to form a swirl flow on the waste receiving surface; a rim water conduit communicating with an opening portion formed in the lower region of the waste receiving surface of the bowl portion.

Nevertheless, in this state-of-the-art document, the toilet described therein does not have a rim or is presented as a "shelf" or similar, which does not correspond to an open rim, nor does it include windows that improve efficiency in water consumption. In addition, the discharge portion or pipe has its maximum point of height at a very low level with respect to the bottom of the bowl, which would not allow obtaining an adequate water level to avoid stains created by solid wastes.

Thus, from the above information, it is clear that in the state of the art there is a series of sanitaryware of the open rim type or rimless, which have a waste discharge channel on their lower surface, and which allow to improve the discharge of waste, where in all cases the discharge channels of the toilets have a constant diameter throughout their trajectory, and where in a single case the force of gravity is not used but the discharge is by the back/side of the toilet, rather than the bottom as is commonly used.

However, it is worth noting the fact that the state of the art documents are related to open-rim toilets that do not allow obtaining an adequate and highly efficient system to carry out the discharges, since the diameter of the waste discharge channel, its height, the width of the waste receiving channel, and other components, do not make it possible to create a substantial difference with the existing matter exists that leads to obtaining a much more efficient discharge of the waste located in the bowl of said toilet.

In accordance with the foregoing, those skilled in the art can clearly see that in the state of the art there is a need to design and implement an open rim toilet, which is highly efficient in its water consumption, while allowing for an adequate discharge with cleaning of the bowl, where it is preferable for the toilet to have a system for raising the water level at the bottom of the bowl, so that solid wastes do not adhere to the walls of said bowl and thus avoiding unpleasant stains.

In the same way, it is necessary for the toilet discharge channel to have a specific geometry that allows for much more suitable discharges to avoid clogging, taking advantage of the siphonic effect that is generated when flushing the toilet.

SUMMARY OF THE INVENTION

The present invention defines a solution to the aforementioned problem by providing an open-rim toilet, which features a series of advantages in relation to the state of the art, since it has a reduced diameter of the waste discharge channel, a high maximum height of said discharge channel that allows maintaining a water level in the bowl, the width of the waste reception channel, and also complies with the fact that it is open rim, but where said rim also has a plurality of windows that allow a more adequate distribution of water for cleaning and flushing in the bowl.

Specifically, the present invention consists of an open rim toilet, which has a low production cost, while minimizing the loss of hydraulic potential supplied to it during the flushing action, thus managing to exceed the minimum evacuation threshold of solid waste established in standard ASME A112.19.2-2018 item 7.9.

Thus, the toilet of the present invention features the characteristics that the distribution of the well or bowl has a configuration that minimizes the amount of water inside it in the style of European-type flush toilets, thus facilitating a horizontal distribution and for the waste elements contained by the well, and a wide entrance to the discharge channel, which goal is to reduce the probability of clogging at the entrance of the channel as the load begins to enter during the discharge action.

Now, the toilet of the present invention also allows an improved operation with respect to the specific attributes of siphonic action toilets, due to the fact that it features a volumetric distribution of the bowl that maximizes the surface of the water mirror, so that the load does not adhere to the walls of the bowl making it difficult to evacuate.

In the same way, it has a configuration of the discharge channel in S, where the level of the input of the channel is above the level of its output and the discharge channel has an intermediate point above the level of both during its trajectory that functions as a spillway, where said condition of the channel generates the basic geometric and physical conditions to promote the appearance of a physical effect of partial vacuum pressure during the discharge (siphonic action) inside the channel, thus generating a sustained evacuation of the heavy load, drying of the well and consequently evacuation of the floating load.

In accordance with the above, to facilitate the generation and maintenance of the siphonic action, the discharge channel of the toilet of the present invention has a conical distribution in its cross-sectional area and a characteristic trajectory; two specific control points where the change in curvature and concavity of the discharge channel is greater, also known in the technical field as brakes, which generate a flow restriction effect facilitating the siphon priming process.

BRIEF DESCRIPTION OF THE DRAWINGS

The present invention is more clearly understood from the following drawings where the components associated with this toilet are shown, as well as the novel elements relative to the state of the art, where the figures are not intended to limit the scope of the invention, which is solely defined by the appended claims, wherein:

FIGS. 14A and 14B are illustrations of the areas and quartiles of the areas where the annulus ports point at, wherein FIG. 14A shows the area of the discharge channel entry point, while FIG. 14B shows the upper area of the water mirror in the bowl.

DETAILED DESCRIPTION OF THE INVENTION

Figure 1:
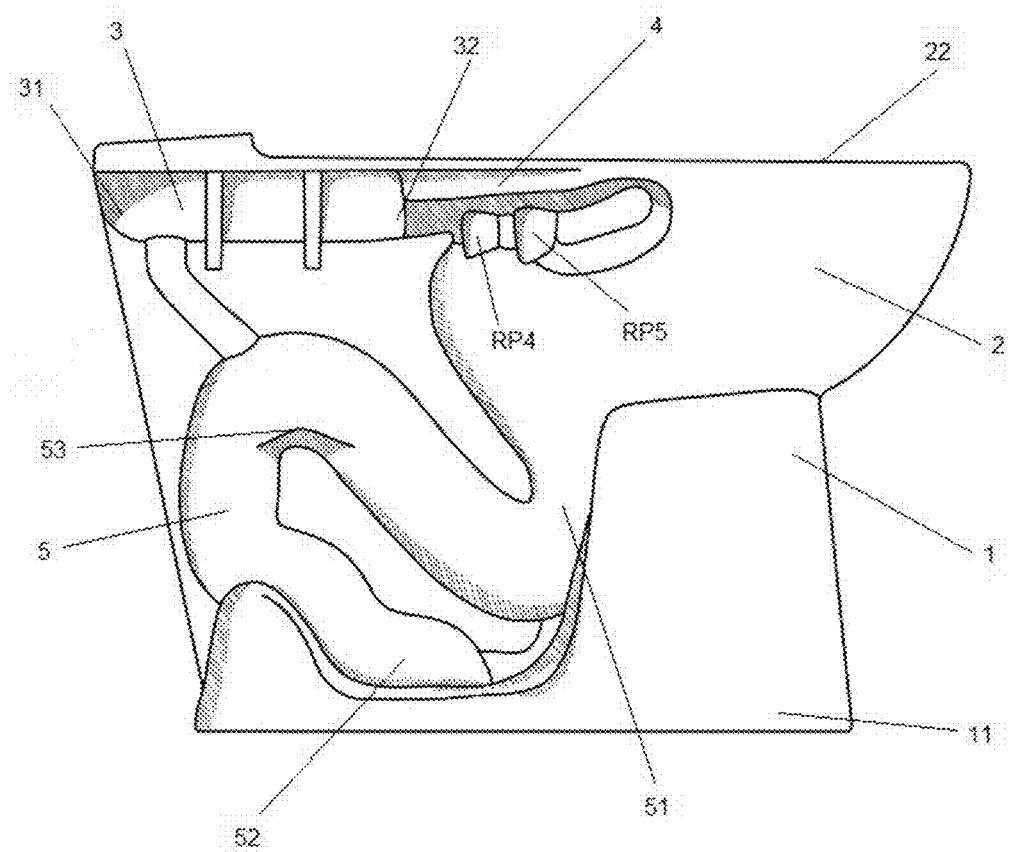
FIG. 1 corresponds to a side view of the open-rim toilet of the present invention.
Figure 2:
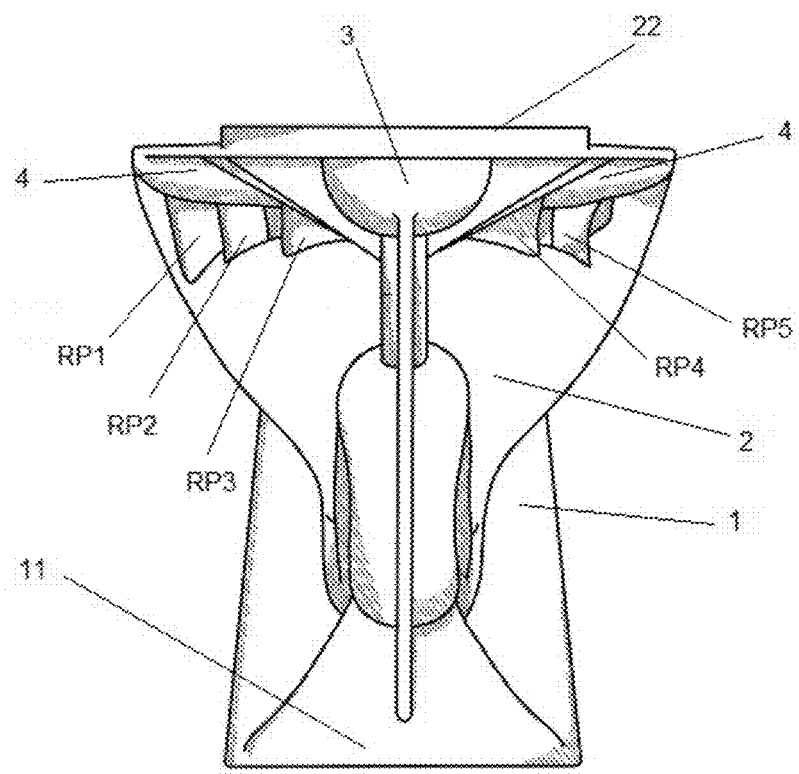
FIG. 2 corresponds to a plane rear view of the open-rim toilet of FIG. 1.
Figure 3:
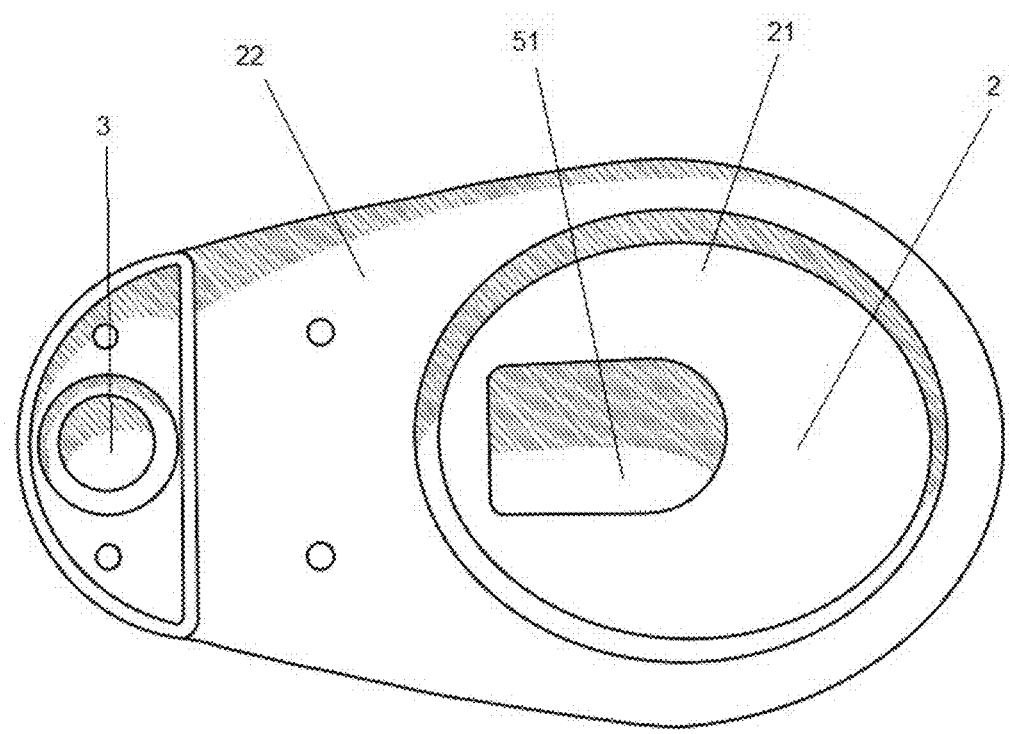
FIG. 3 corresponds to a plane top view of the open-rim toilet of FIG. 1.
Figure 4:
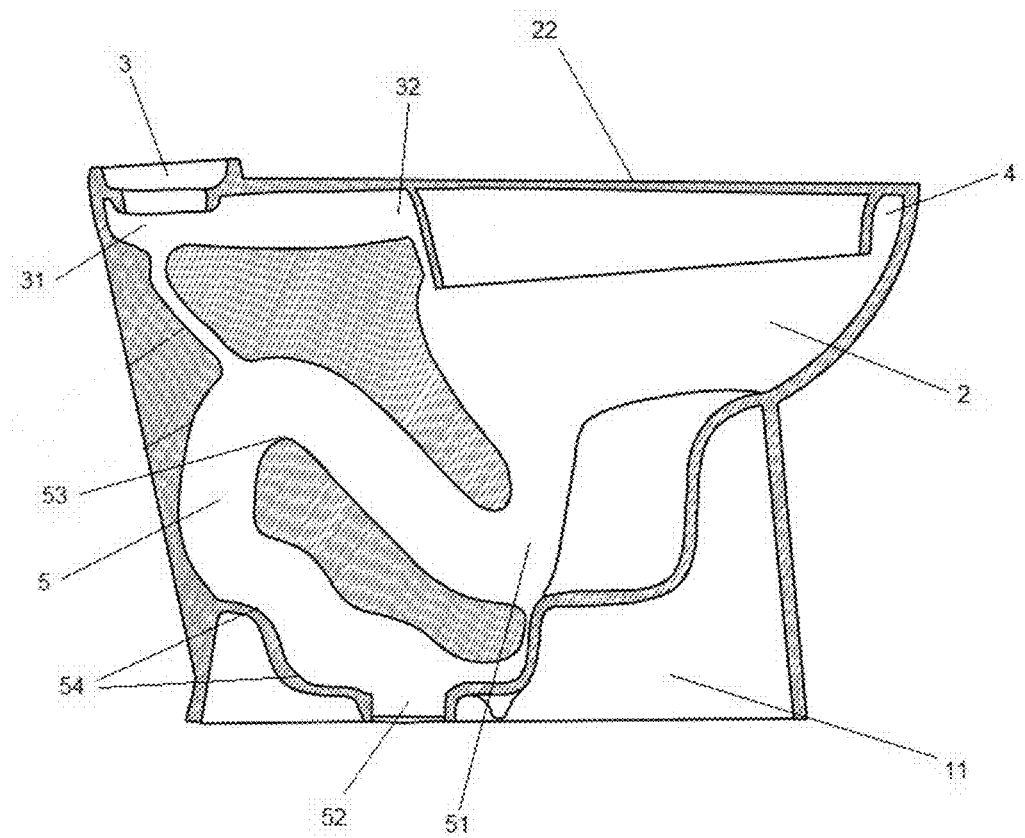
FIG. 4 corresponds to a cross-sectional view of the open-rim toilet of FIG. 1.

The present invention is directed to an open-rim toilet that has a performance that balances the capacity for evacuation of solid waste and light floating load inside the sanitary apparatus, which also has an excellent capacity for dragging waste, it being achieved due to a series of configurations of the components of said toilet, different from the existing in the state of the art, as will be defined below.

Figure 5:
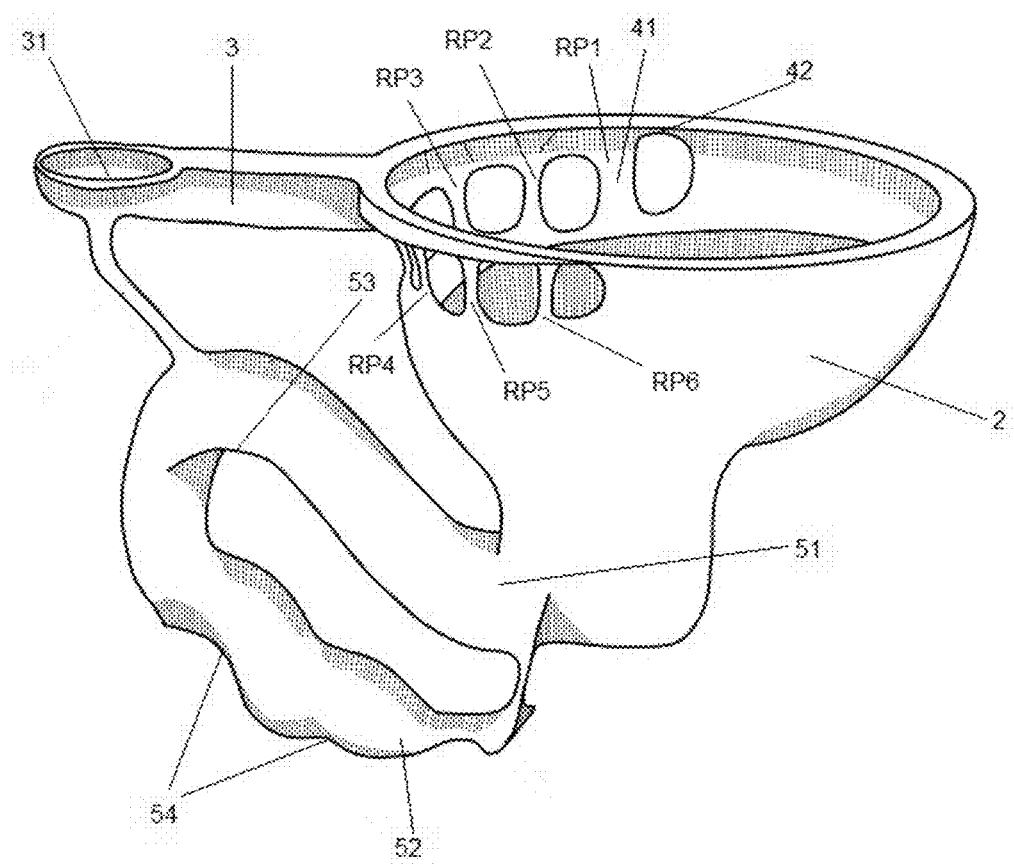
FIG. 5 corresponds to a reverse general perspective view of the toilet of the present invention, where the elements that are usually hollow are shown, in order to show the internal parts of said toilet.
Figure 6:
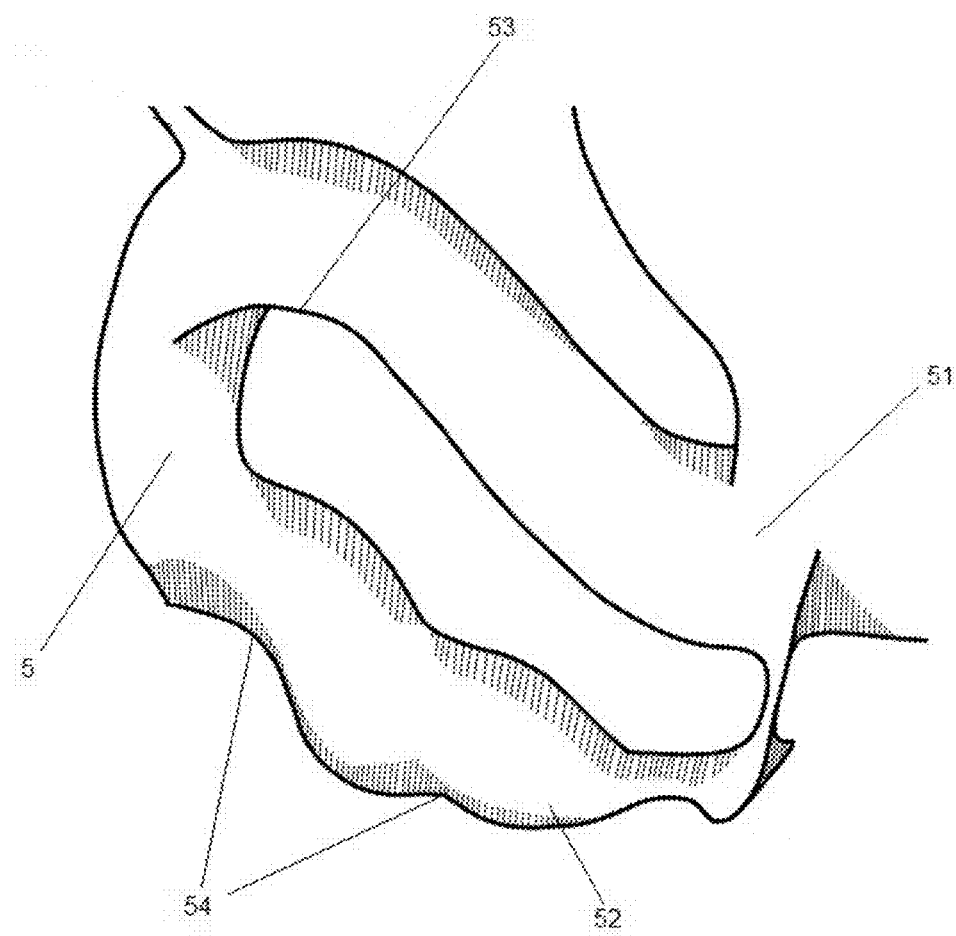
FIG. 6 corresponds to a detailed view of the toilet discharge channel as shown in FIG. 5.

In this regard, FIGS. 1 to 4 specifically show the open-rim toilet of the present invention with its respective design and functioning characteristics which make it different from those existing in the state of the art, wherein said toiled comprises, in general, the following parts or components:

A main body (1) having a base (11) located in the lower part thereof and that comes into contact with the ground where the toilet is installed;

A bowl (2) located above the base (11) of the main body (1), wherein said bowl (2) is intended to receive the residues or waste through the access entrance (21) that extends around the contour of the upper part of the toilet, and features an upper surface (22) extending from the front to the rear part of the toilet;

An inlet tray (3) located in the upper part of the bowl (2) below the upper surface (21) thereof, towards the rear of the toilet, where said inlet tray (3) is the one that receives the water to discharge the waste into the bowl (2) and has a tray inlet (31) and a tray outlet (32), wherein the tray inlet (31) is located at the back of the toilet and comes into direct contact with the water source (not shown) (either a flushometer or a water storage tank, or another source), while the outlet of the tray (32) communicates fluidly with the inside of the bowl (2);

A rim (4) located in the upper internal part of the bowl (2) and which communicates fluidly with the outlet (32) of the inlet tray (3), wherein said rim (4) is open and is distributed along the access entrance (21) of the bowl (2), while featuring a series of ports (41) and windows (42), specifically illustrated in FIG. 5, which direct the water in a specific manner, generating a combined effect of floating and inertial release of the heavy load inside the bowl (2), facilitating the progressive entry of the load into a discharge channel (5) for its evacuation; and A discharge channel or trapway (5) which is substantially S-shaped located at the bottom of the bowl (2), where said discharge channel or trapway (5) has an inlet (51) and an outlet (52) which levels are in a different plane, preferably, the input level (51) is above the output level (52), as illustrated in FIG. 6, and a series of brakes (54) arranged along the entire trapway (5), that is, between the inlet (51) and the outlet (52), where the discharge channel or trapway (5) also has an intermediate point (53) above the level of the inlet (51) and the outlet (52) during its trajectory that works as a weir.

Thus, the present invention defines an open-rim toilet whose combined construction elements generate a unique combination different from those toilets existing in the state of the art, with which a performance is obtained that balances the capacity for evacuation of solid waste and a light floating load inside the toilet, in addition to a considerable increase in the capacity to carry waste through the drainage line.

Preferably, the toilet of the present invention intends in its configuration to minimize the loss of hydraulic potential supplied to the toilet during the flushing action, from the entrance of water through the inlet tray (3) towards a set of discharge ports (41) located in the rim (4) and windows (42) directing the water in a specific manner generating a combined effect of floating and inertial release of the heavy load inside the bowl (2), facilitating the progressive entry of the load to the discharge channel or trapway (5) for its respective evacuation.

In this sense, the toilet of the present invention maximizes the result of the previously defined effect through a balance between the formal attributes of a flush action toilet (commonly known as Washdown) with specific attributes of siphonic action toilets, featuring a combination of highly efficient properties.

Specifically, the toilet of the present invention has a series of characteristics and properties that differ from the state of the art, among which is the distribution of its bowl (2) with a configuration that minimizes the amount of water therein, thus facilitating a horizontal and stacking distribution of the waste elements contained by the bowl (2), and an entrance to the discharge channel or trapway (5) which is wide, whose objective is to reduce the probability of clogging in the entrance (51) of said discharge channel or trapway (5) to the extent that the load begins its entry during the discharge action.

In the same way, the toilet of the present invention has a volumetric distribution of the bowl (2) that maximizes the surface of the water mirror at the bottom of said bowl, so that the load does not adhere to the walls of the bowl (2) making its evacuation difficult, and a configuration of the discharge channel or trapway (5) that is in S, where the level of the entrance (51) of the channel (5) is above the level of its outlet (52), such as previously indicated, while the discharge channel or trapway (5) has an intermediate point (53) which level is above the level of the inlet (51) and the outlet (52) during its trajectory that works as a weir.

Thus, the previous condition of the discharge channel or trapway (5) generates the basic geometric and physical conditions to promote the appearance of a physical effect of partial vacuum pressure during the discharge, called siphonic action, inside said channel (5), thus generating a sustained evacuation of the heavy load, drying of the well and, consequently, an evacuation of the floating load in an adequate manner, that is, progressive and with less possibility of clogging.

In accordance with the foregoing, to facilitate the generation and sustaining of the aforementioned siphonic action, the discharge channel or trapway (5) has a conical distribution in its cross-sectional area and a characteristic trajectory; some specific control points, preferably two, where the change in curvature and concavity of the discharge channel or trapway (5) are inverted, where said control points correspond to brakes (54) as clearly illustrated in FIG. 6, which generate a flow restriction effect thus facilitating the process of priming the siphon.

Now, below, the ranges that allow the geometrization of the constituent elements of the toilet of the present invention are described, their relationships and relevant geometric characteristics which allow obtaining a superior and different product with respect to those existing in the state of the art or commercially available. Thus, the configuration and sequence of intervention of the construction elements, in addition to the generation of combined effects on the flow of water that flows therethrough, are the basis of the novelty on which the invention described in this document is based.

Figure 7:
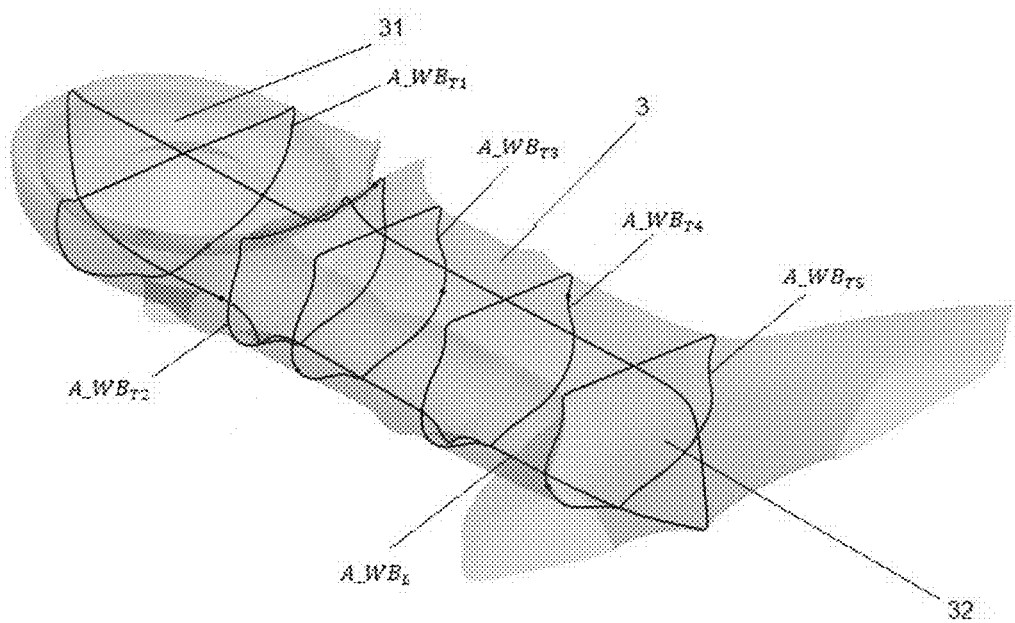
FIG. 7 corresponds to a diagram of the geometry of the inlet tray being part of the toilet of the present invention.

Specifically, the geometry of the internal volumetry of the flow area of the inlet tray (3) can be described based on the following expressions, where the related areas are represented in FIG. 7:

$$A\_WB_L > A\_WB_{Ti}$$

Where i={1,2,3,4,5}, wherein i=1 corresponds to the area in the inlet (31) and i=5 corresponds to the area in the outlet (32) while the geometric relationship of the cross-sectional areas $A\_WB_{Ti}$ vs longitudinal $A\_WB_L$ of said input tray (3), is defined in Table 1 below. For greater clarity, FIG. 8 shows the aforementioned cross-sectional and longitudinal areas so that those skilled in the art can demonstrate the same and their relationship within the inlet tray (3).

TABLE 1

Figure 8:
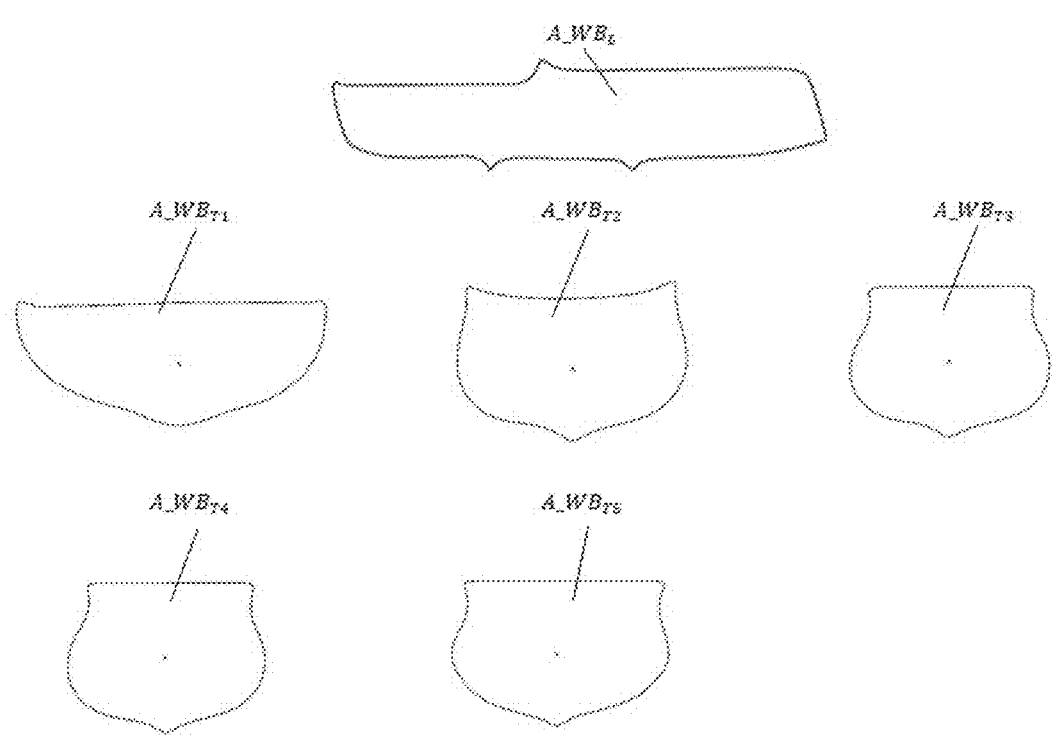
FIG. 8 corresponds to the inlet tray geometry schematics as shown in FIG. 7, where each area section is shown separately.

Geometric relationship of transversal areas $A\_WB_{Ti}$ vs longitudinal $A\_WB$, as shown in FIG. 8.

| Area i | $A\_WB_{Ti}/A\_WB_L$ |
|---|---|
| 1 | [25-27]% |
| 2 | [19-21]% |
| 3 | [21-23]% |
| 4 | [21-23]% |
| 5 | [21-24]% |

Figure 9:
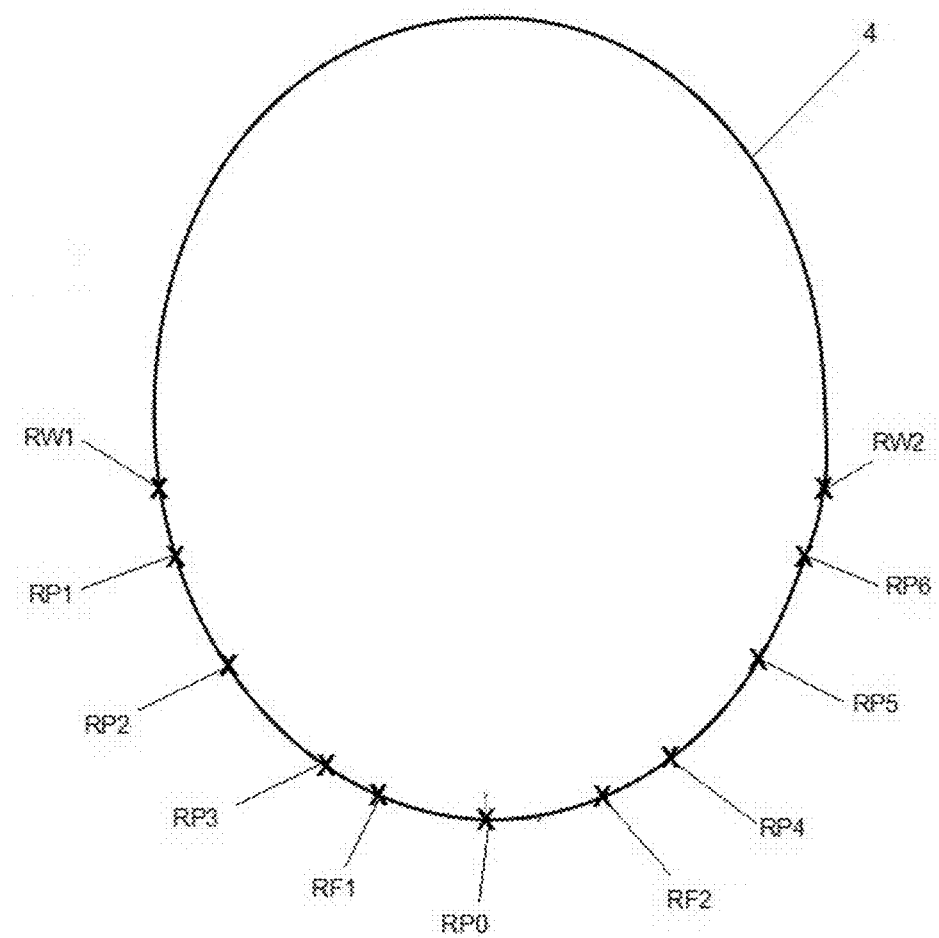
FIG. 9 corresponds to a diagram of the geometry of the rim being part of the toilet of the present invention and its construction elements, where said geometry shows the points of the windows in the rim according to the data illustrated in Table 3.

On the other hand, the basic geometry of the profile for the rim (4), the relative position of the location of the rim windows (42), the rim discharge ports (41) and the rim feeding areas (4) are illustrated in FIG. 9. Likewise, the following tables show the unitary proportions between the length of the rim vs. its width, using the length of the rim as a reference, and the unitary length of the segments with respect to the length of the rim (4) profile perimeter.

TABLE 2

Length and width of the rim (4) expressed as a unitary measure with respect to the length of said rim (4).

| Dimension | Rounded Profile. Value (unitary) | Elongated Profile Value (unitary) |
|---|---|---|
| Rim Length | 1 | 1 |
| Rim Width | 0.73 | 0.84 |

TABLE 3

Perimeter spacing length around the rim profile of the constituent elements, rim window (42), rim discharge port (41) and rim feeding port, according to the points shown in FIG. 9.

| Segment | Round Profile | Elongated Profile |
|---|---|---|
| RW1-RP1 | 0.051-0.053 | 0.047-0.049 |
| RP1-RP2 | 0.059-0.061 | 0.055-0.057 |
| RP2-RP3 | 0.025-0.027 | 0.023-0.025 |
| RP3-RF1 | 0.048-0.050 | 0.045-0.047 |
| RF1-PR0 | 0.048-0.050 | 0.045-0.047 |
| RP0-RF2 | 0.025-0.027 | 0.023-0.025 |
| RF2-RP4 | 0.059-0.061 | 0.055-0.057 |
| RP4-RP5 | 0.051-0.053 | 0.047-0.049 |
| RP5-RP6 | 0.028-0.030 | 0.026-0.028 |
| RP6-RW2 | 0.55-0.57 | 0.58-0.60 |
| RW2-RW1 | 0.051-0.053 | 0.047-0.049 |
| TOTAL | ~1 | ~1 |

Thus, the general relationship between the outlet (32) cross-sectional areas of the inlet tray (3) $A\_WB_{TS}$, the rim discharge ports (41) ($A\_RP0_T$, $A\_RP1_T$, $A\_RP2_T$, $A\_RP3_T$, $A\_RP4_T$, $A\_RP5_T$), the rim windows (42) ($A\_RW1_T$ y $A\_RW2_T$) and the rim (4) feeding areas ($A\_RF1_T$ and $A\_RF2_T$) are described in the following table.

TABLE 4

Geometrization of rim feeding ports RF $(0.13) \cdot A\_WB_{TS} \leq A\_RP1_T \leq (0.145) \cdot A\_WB_{TS}$
$(0.025) \cdot A\_WB_{TS} \leq A\_RP2_T \leq (0.026) \cdot A\_WB_{TS}$
$(0.029) \cdot A\_WB_{TS} \leq A\_RP3_T \leq (0.030) \cdot A\_WB_{TS}$
$(0.029) \cdot A\_WB_{TS} \leq A\_RP4_T \leq (0.029) \cdot A\_WB_{TS}$
$(0.027) \cdot A\_WB_{TS} \leq A\_RP5_T \leq (0.028) \cdot A\_WB_{TS}$
$(0.13) \cdot A\_WB_{TS} \leq A\_RP6_T \leq (0.145) \cdot A\_WB_{TS}$
$(0.085) \cdot A\_WB_{TS} \leq A_{RP0_T} \leq (0.095) \cdot A\_WB_{TS}$
$(0.019) \cdot A\_WB_{TS} \leq A\_RW1_T \leq (0.020) \cdot A\_WB_{TS}$
$(0.014) \cdot A\_WB_{TS} \leq A\_RW2_T \leq (0.015) \cdot A\_WB_{TS}$
$(0.24) \cdot A\_WB_{TS} \leq A\_RF1_T \leq (0.26) \cdot A\_WB_{TS}$
$(0.24) \cdot A\_WB_{TS} \leq A\_RF2_T \leq (0.26) \cdot A\_WB_{TS}$ The relationship between the different cross-sectional areas that describe the geometry of the bowl (2) is listed in the following table, where the areas of interest are defined below:

Area in the inlet (51) of the discharge channel (5), $A\_TWPI_1$.

Area defined by the water mirror $A\_WM_1$ leveled with the discharge channel or trapway (5) weir (53).

Cross-section area of the bowl (2) at the level of the top point in the inlet (51), called or commonly known as "dam" $A\_WM_2$.

Cross-section area of the bowl (2) at the level of the intermediate point of the inlet (51) in the discharge channel or trapway (5) $A\_WM_3$.

Longitudinal area of the bowl (2) $A\_WL_1$.

Three vertical areas, $A\_WT_1$, $A\_WT_2$ y $A\_WT_3$, which corresponds to the vertical areas located from the rear part to the front part of the toilet, wherein $A\_WT_1$ corresponds to the vertical area of the most posterior part close to the inlet (S1) of the discharge channel or trapway(S), and wherein $A\_WT_3$ corresponds to the vertical area of the front or anterior part.

Upper and cross-section areas of the bowl (2), against the area of the discharge channel (5) inlet (51).

TABLE 5

Figure 12:
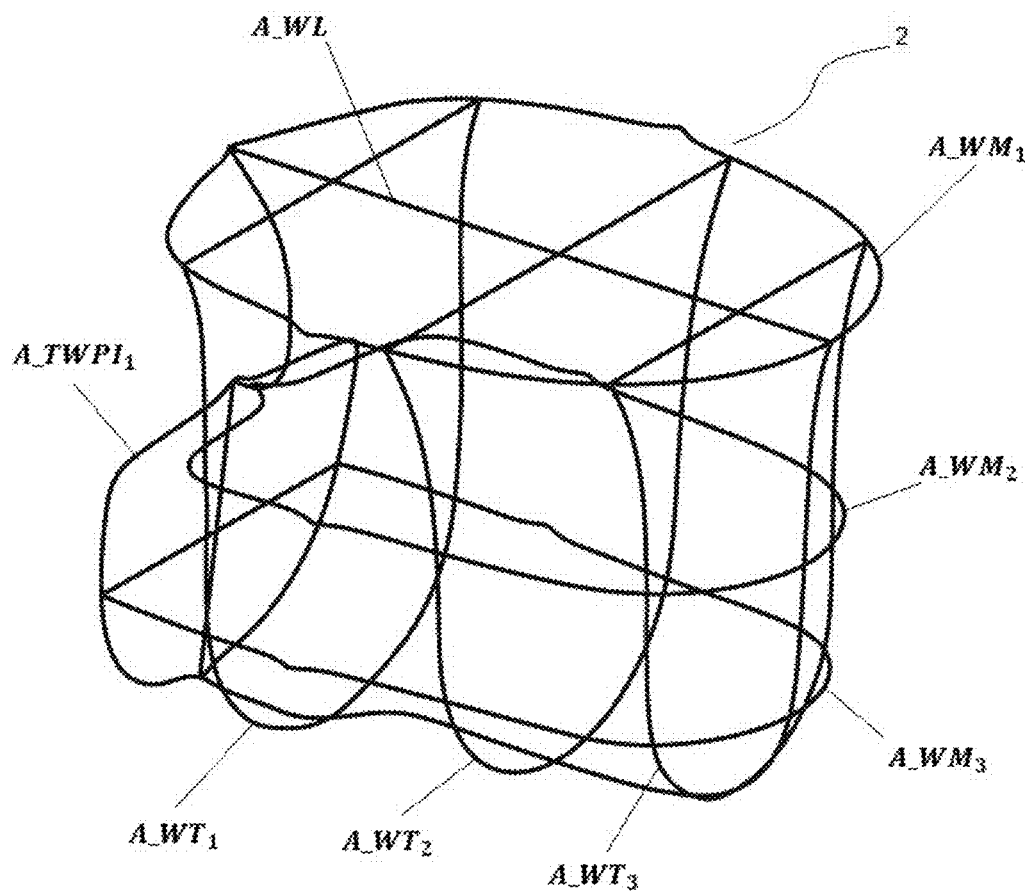
FIG. 12 corresponds to a diagram of the geometry of the bowl being part of the toilet of the present invention, including the reflecting pool and other areas comprising it.
Figure 13:
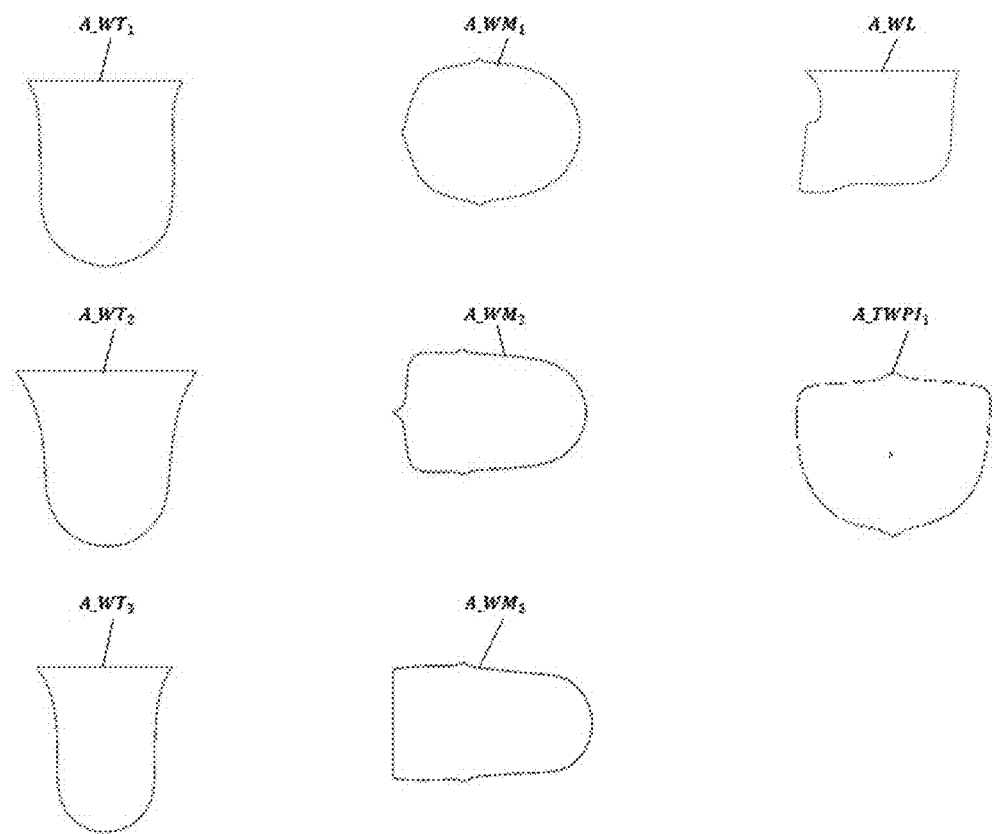
FIG. 13 corresponds to bowl geometrization schemes as shown in FIG. 12, where each area section is shown separately.

Relationship between the cross-section areas forming the bowl (2) according to the geometrization shown in Figures 12 and 13.

| Section | $\dfrac{A\_WM_i}{A\_TWPI_1}$ | $\dfrac{A\_WL}{A\_TWPI_1}$ | $\dfrac{A\_WT_i}{A\_TWPI_1}$ |
|---|---|---|---|
| $A\_WM_1$ | [2.95-3.05] | | |
| $A\_WM_2$ | [2.05-2.1] | | |
| $A\_WM_3$ | [2.15-2.2] | | |
| $A\_WL$ | | [3.25-3.35] | |
| $A\_WT_1$ | | | [1.95-2] |
| $A\_WT_2$ | | | [1.85-1.9] |
| $A\_WT_3$ | | | [1.33-1.36] |

Figure 14A:
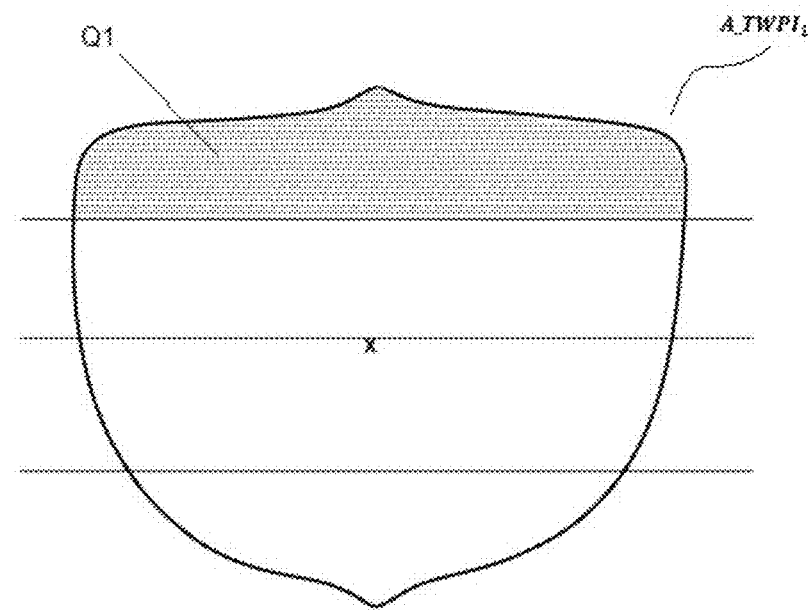

In a preferred embodiment, the orientation of the rim ports (41) can be described by pointing to points respectively located in the upper quartile (Q1) of the area described by the entrance to the discharge channel (3) (illustrated in FIG. 14A and which corresponds to $A\_TWPI_1$), where the ports (41) defined at points RP3 and RP4 (shown in FIG. 9) point to that first or upper quartile (Q1) of said area $A\_TWPI_1$.

Figure 14B:
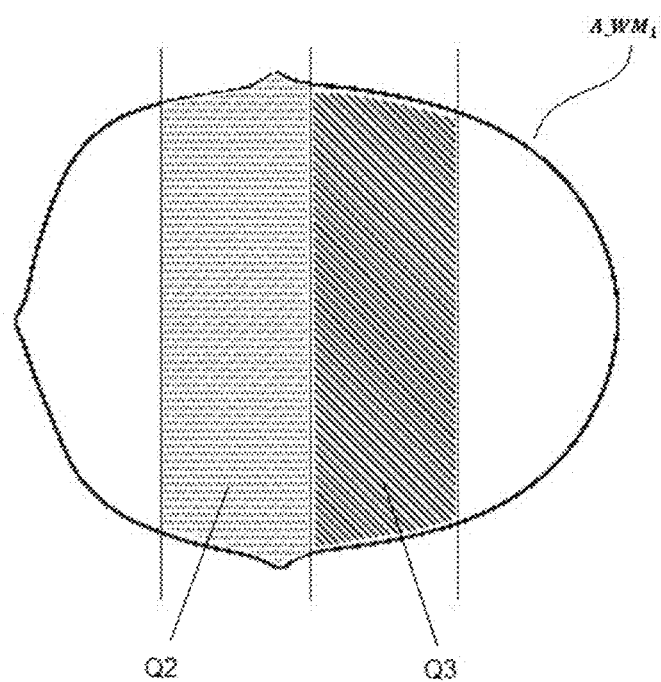

In the same way, the orientation of the ports (41) defined in points RP2 and RP5 (shown in FIG. 9) aim at the points in the second quartile (Q2) of the plan area of the water mirror at the level of the spillway or weir of the discharge channel or trapway (5) (illustrated in FIG. 14B and corresponding to area $A\_WM_1$), while ports (41) defined at points RP1 and RP6 (shown in FIG. 9) aim at the points located in the third quartile (Q3) of the plan area of the water mirror at the level of the discharge channel weir (5) (illustrated in FIG. 14B and corresponding to area $A\_WM_1$), where the second quartile corresponds to the second section of the area shown in FIG. 14B from left to right, while the third quartile corresponds to the second section of the area shown in FIG. 14B from right to left.

This arrangement of the rim (4) ports (41) allows for a more effective discharge in the present configuration and a more suitable and efficient cleaning system for the bowl (2), since it allows the discharge water to be distributed throughout said bowl (2).

Figure 10:
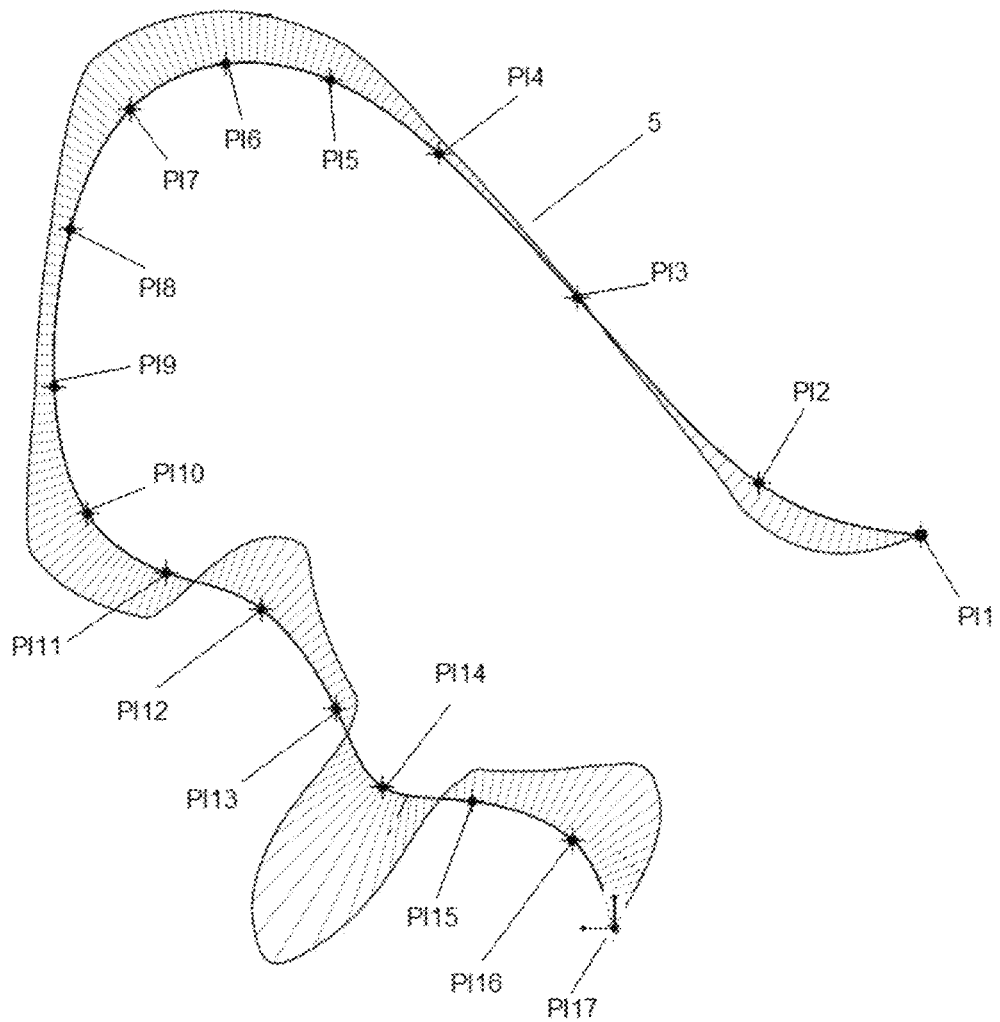
FIG. 10 corresponds to a diagram of the geometry of the discharge channel being part of the toilet of the present invention and the location of interpolation points (trajectory and curvature relationship).
Figure 11:
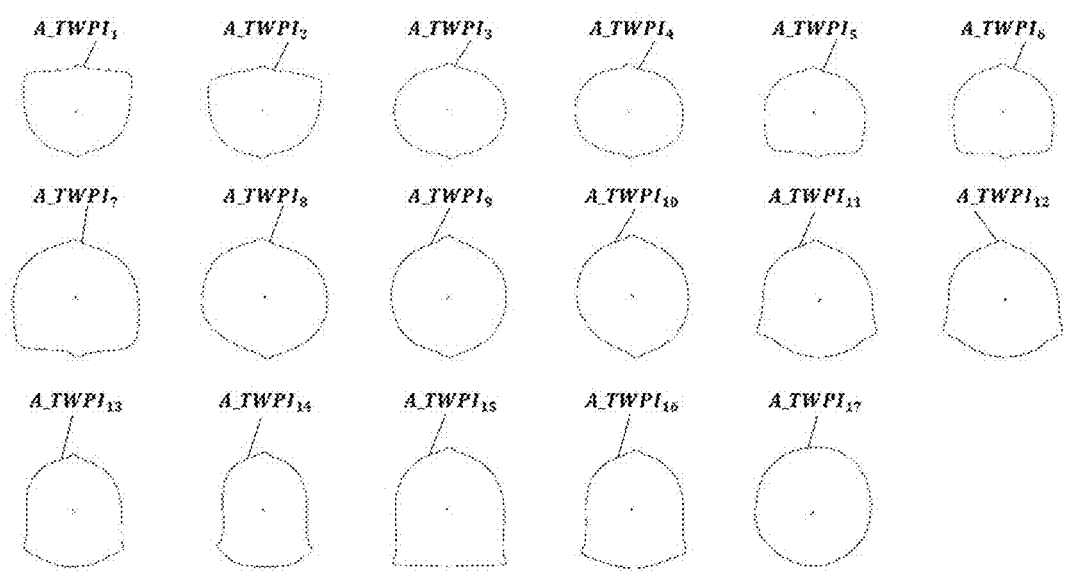
FIG. 11 corresponds to geometrization schemes of the discharge channel as shown in FIG. 10, where each area section is shown separately.

Now, in relation to the discharge channel (5) illustrated in FIG. 5, in the trajectory of said component, the different interpolation points thereof $[PI_1 \ldots PI_{17}]$ (FIG. 10) and the brakes (54) of the channel (5) are shown in FIG. 10 and the relationships between the perpendicular areas $[A\_TWPI_1 \ldots A\_TWPI_{17}]$ (FIG. 11) to the trajectory in each of the control points or brakes (54), can be described by the following relationships and tables:

The following Tables 6 and 7 show the relative position references between the PI interpolation points in the path of the discharge channel or trapway (5), as illustrated in FIGS. 10 and 11. The dimensions indicated are dimensionless, defined with respect to the unitary reference of the height from the floor to the rim (4) and using the center of the outlet (52) of the discharge channel or trapway (5) as a coordinate reference.

TABLE 6

Relative position ranges of the discharge channel (5) interpolation points $PI_i$.

| PI | x | y |
|---|---|---|
| PI1 | [0.1789; 0.1924] | [0.2459; 0.2985] |
| PI2 | [ 0.0998; 0.1073] | [0.2696; 0.3205] |
| PI3 | [−0.029; −0.031] | [0.4046; 0.4461] |
| PI4 | [−0.114; −0.106] | [0.4891; 0.5248] |
| PI5 | [−0.179; −0.166] | [0.5316; 0.5643] |
| PI6 | [−0.242; −0.225] | [0.5412; 0.5732] |
| PI7 | [−0.299; −0.278] | [0.5151; 0.0581] |
| PI8 | [−0.338; −0.314] | [0.4422; 0.0465] |
| PI9 | [−0.349; −0.325] | [0.3338; 0.0348] |
| PI10 | [−0.327; −0.304] | [0.2566; 0.2503] |
| PI11 | [−0.280; −0.260] | [0.2225; 0.2069] |
| PI12 | [−0.224; −0.208] | [0.2023; 0.1882] |
| PI13 | [−0.170; −0.158] | [0.1307; 0.1215] |
| PI14 | [−0.145; −0.134] | [0.0885; 0.0823] |
| PI15 | [−0.091; −0.085] | [0.0795; 0.0739] |
| PI16 | [−0.023; −0.022] | [0.0530; 0.0493] |
| PI17 | 0 | 0 |

TABLE 7

Ratio of the cross-sectional areas of the discharge channel (5) at points $PI_i$

| $A\_TWPI_i$ | $\dfrac{A\_TWPI_i}{A\_TWPI_1}$ |
|---|---|
| 1 | 1 |
| 2 | [0.81-0.83] |
| 3 | [0.66-0.68] |
| 4 | [0.65-0.665] |
| 5 | [0.675-0.685] |
| 6 | [0.65-0.75] |
| 7 | [0.65-0.7] |
| 8 | [0.475-0.525] |
| 9 | [0.42-0.45] |
| 10 | [0.425-0.44] |
| 11 | [0.465-4.475] |
| 12 | [0.47-0.48] |
| 13 | [0.51-0.53] |
| 14 | [0.59-0.61] |
| 15 | [0.49-0.51] |
| 16 | [0.54-0.55] |
| 17 | [0.77-0.79] |

In this sense, the trajectory of the discharge channel or trapway (5) features an inversion in its curvature in the segment included between points [PI2-PI3], describing the elevation of the discharge channel or trapway (5) from the inlet (51) towards the discharge channel weir.

According to the data included in the previous tables, the first brake (54) can be described as the portion of the discharge channel or trapway (5) between points [PI11-PI13], where the change in curvature defining it occurs between points [PI11-PI12]. Likewise, the second brake (54) can be described as the portion of the discharge channel or trapway (5) between points [PI13-P15], where the change in curvature defining it occurs between points [PI13-PI14] and the change defining its closure occurs between points [P14-P15].

The terms "comprising" or "including" used throughout this document are understood to be extensive and not limiting, that is, that the present invention may comprise other additional components, which are not specifically defined within the present specification, but which are obviously used for the respective operation of the device, apparatus or system, and are clear for those skilled in the art.

Although the above description defines the preferred embodiments of the present invention, different modifications that may be evident to those skilled in the art are also contemplated within the scope of this document, where said scope is in no way limited to the preferred embodiments, but it is defined solely by the appended claims and the subject matter contained therein.

The invention claimed is:

1. An open-rim toilet comprising:
a main body (1) having a base (11) located in the lower part thereof;
a bowl (2) located above the base (11), having an access entrance (21) extending around the contour of the upper part of the toilet, and having an upper surface (22) extending from the front to the rear part of the toilet;
an inlet tray (3) located in the upper part of the bowl (2) below the upper surface (21) thereof, towards the rear of the toilet, where said inlet tray (3) has a tray inlet (31) and a tray outlet (32);
a rim (4) located in the upper internal part of the bowl (2) and which communicates fluidly with the outlet (32) of the inlet tray (3), wherein said rim (4) is open and is distributed along the access entrance (21) of the bowl (2), while having a series of ports (41) and windows (42) for water direction; and
an S-shaped discharge channel or trapway (5) located at the bottom of the bowl (2), having an inlet (51) and an outlet (52), wherein the inlet level (51) locates above the outlet level (52), comprising some brakes (54) arranged along the trapway (5), and having an intermediate point or weir (53) above the inlet (51) and outlet (52) level; wherein the bowl (2) has a geometrization defined by:

$$\frac{A\_WM_i}{A\_TWPI_1} = [2.05 - 3.05];$$

$$\frac{A\_WL}{A\_TWPI_1} = [3.25 - 3.35]; \frac{A\_WT_i}{A\_TWPI_1} = [1.33 - 2]$$

where i is 1, 2 or and $A\_WM_1$ corresponds to the area described by the water mirror leveled with the weir (53) of the discharge channel or trapway (5), cross-section area of the bowl (2) at the level of the highest point of the inlet (51) or dam and cross-section area of the bowl (2) at the level of the intermediate point of the inlet (51) in the discharge channel or trapway (5);
$A\_WL_1$ corresponds to the longitudinal area of the bowl (2); $A\_WT_1$ corresponds to three vertical areas; and $A\_TWP_1$ corresponds to the area in the inlet (51) of the discharge channel (5),
where the orientation of the rim ports (41) is arranged pointing to an upper quartile (Q1) of the area described by the entrance to the discharge channel or trapway (5), a second quartile (Q2) of the plan area of the water mirror at the level of the spillway or weir (53) of the discharge channel or trapway (5), and a third quartile (Q3) of the plan area of the water mirror at the level of the discharge channel or trapway (5).

2. The open-rim toilet according to claim 1, wherein the inlet tray (3) has an internal volumetry geometrization of the flow area defined by $A\_WB_L > A\_WB_{Ti}$ where i={1,2,3,4,5}, and $A\_WB_{Ti}$ and $A\_WB_{TL}$ correspond to cross-section and
longitudinal areas of said inlet tray (3), and wherein i=1 corresponds to the area in the inlet (31) and i=5 corresponds to the area in the outlet (32).

3. The open-rim toilet according to claim 1, wherein the inlet (31) of the tray (3) is located in the upper part of the toilet and is in direct contact with a water source, and the outlet (32) of the tray (3) is in fluid communication with inside of the bowl (2).

4. The open-rim toilet according to claim 1, wherein the entrance (51) to the discharge channel or trapway (5) has a sufficient amplitude to reduce the probability of clogging the same.

5. The open-rim toilet according to claim 1, wherein the discharge channel or trapway (5) has a conical distribution in its cross-sectional area.

6. The open-rim toilet according to claim 1, wherein the discharge channel or trapway (5) contains two control points or brakes (54), where the change in curvature and concavity of the discharge channel(S) is greater.

7. The open-rim toilet according to claim 1, wherein the rim (4) has six ports (RP1, RP2, RP3, RP4, RP5, RP6) and two windows (RW1, RW2), where ports (RP3 and RP4) are arranged pointing at the first quartile (Q1) of the discharge channel or trapway (5), ports (RP2 and RP5) are arranged pointing at points in the second quartile (Q2) of the plan area of the water mirror leveled with the discharge channel or trapway (5), and ports (RP1 and RP6) are arranged pointing at points located in the third quartile (Q3) of the plan area of the water mirror leveled with the discharge channel or trapway (5).

* * * * *

UNITED STATES PATENT AND TRADEMARK OFFICE
CERTIFICATE OF CORRECTION

PATENT NO. : 12,448,766 B2  
APPLICATION NO. : 18/032925  
DATED : October 21, 2025  
INVENTOR(S) : William de Jesus Castro Zapata, Rodrigo Alberto Estrada Mesa and Jaime Humberto Valencia Cortes Page 1 of 1

It is certified that error appears in the above-identified patent and that said Letters Patent is hereby corrected as shown below:

In the Claims

Claim 6, last line (Column 12), the element "channel (S)" should read "channel (5)".

Signed and Sealed this  
Second Day of December, 2025

John A. Squires  
*Director of the United States Patent and Trademark Office*